United States Patent [19]
Kuroda et al.

[11] Patent Number: 6,038,882
[45] Date of Patent: Mar. 21, 2000

[54] ABSORPTION CHILLER-HEATER AND METHOD FOR FORMING INITIAL ANTICORROSIVE FILM THEREFOR

[75] Inventors: Tetsuo Kuroda, Tokyo; Matsuho Miyasaka; Norio Takahashi, both of Kanagawa-ken, all of Japan

[73] Assignee: Ebara Corporation, Tokyo, Japan

[21] Appl. No.: 09/177,113

[22] Filed: Oct. 22, 1998

[30]  Foreign Application Priority Data

Oct. 24, 1997  [JP]  Japan ..................................... 9-309569
Oct. 19, 1998  [JP]  Japan ................................. 10-296847

[51] Int. Cl.$^7$ .................................................... F25B 41/00
[52] U.S. Cl. ................................................ 62/476; 62/112
[58] Field of Search ............................... 62/476, 112, 101

[56]  References Cited

U.S. PATENT DOCUMENTS

| | | |
|---|---|---|
| 2,755,170 | 7/1956 | Stubblefield et al. . |
| 3,200,604 | 8/1965 | Greeley ........................................ 62/85 |
| 4,912,934 | 4/1990 | Itoh et al. ................................... 62/112 |
| 5,377,494 | 1/1995 | Takagi et al. .............................. 62/102 |
| 5,806,337 | 9/1998 | Mabuchi et al. ........................... 62/476 |
| 5,811,026 | 9/1998 | Phillips et al. ............................. 252/74 |

FOREIGN PATENT DOCUMENTS 2-183778  7/1990  Japan .
3-174487  7/1991  Japan .

*Primary Examiner*—Henry Bennett
*Assistant Examiner*—Melvin Jones
*Attorney, Agent, or Firm*—Armstrong, Westerman, Hattori, McLeland & Naughton

[57]  ABSTRACT

An object of the present invention is to provide a method for forming an initial anticorrosive film in an absorption chiller-heater, by selecting optimal conditions of absorbent solution, steel material surface and film-forming operation for forming a good initial anticorrosive film. In the process for forming an initial anticorrosion film in an absorption chiller-heater having steel parts and containing an absorbent solution comprising lithium bromide as its main component and containing a lithium molybdate corrosion inhibitor according to the present invention, the main characteristics are that at least part of the steel parts of the absorption chiller-heater contacting with an absorbent solution at a temperature of higher than 100° C. include a bare metal surface having an arithmetic mean surface roughness of not more than 1.0 μm; the absorbent solution supplied comprises lithium bromide as its main component and contains a lithium molybdate corrosion inhibitor dissolved in the solution at a level of 450–750 ppm; and that an initial anticorrosion film forming operation is conducted at a condition such that amount of the lithium molybdate dissolved in the absorbent solution is maintained at not less than 200 ppm.

10 Claims, 12 Drawing Sheets

RELATION OF VARIOUS CORROSION
INHIBITORS WITH CORROSION-INDUCED
WEIGHT LOSS

SOLUBILITY OF $Li_2MoO_4$ IN A LITHIUM
BROMIDE ABSORBENT SOLUTION
(ROOM TEMPERATURE)

INFLUENCE OF $Li_2MoO_4$ LEVEL ON CORROSION OF MILD STEEL

INFLUENCE OF LiOH LEVEL ON
CORROSION OF STEEL

LiOH LEVEL (N)
(BASED ON 55wt% LiBr)

INFLUENCE OF LiOH LEVEL ON
CORROSION OF COPPER
(55wt% LiBr, 100 ppm $Li_2MoO_4$, 140°C)

HYDROGEN GAS EVOLATION WITH
DIFFERENT SURFACE TREATMENTS

CORRELATION BETWEEN SURFACE
ROUGHNESS(Ra) AND HYDROGEN
GAS EVOLUTION

VARIATION OF HYDROGEN GAS EVOLUTION WITH BURNING TIME

VARIATION OF HYDROGEN GAS EVOLUTION WITH BURNING TIME

VARIATION OF HYDROGEN GAS EVOLUTION WITH BURNING TIME

VARIATION OF HYDROGEN GAS EVOLUTION WITH BURNING TIME

ABSORPTION CHILLER-HEATER AND METHOD FOR FORMING INITIAL ANTICORROSIVE FILM THEREFOR

BACKGROUND OF THE INVENTION

The present invention relates to an absorption chiller-heater and a method for forming an initial anticorrosive film therefor, and more specifically to an absorption chiller-heater in which a very good initial anticorrosive film is formed by using a special absorbent solution for the absorption chiller-heater and a special steel parts surface on which an anticorrosive film is to be formed as well as a method for forming such an initial anticorrosive film.

Generally, absorption chiller-heaters (absorption refrigerating machines) use an absorbent solution based on lithium bromide, and water as a refrigerant. In the present specification, the term "absorption chiller-heater" includes an absorption chiller which only functions to chill cold water as well as an absorption chiller/heater which may function as a chiller and also as a heater to heat hot water. The high-temperature regenerator used therein constitutes a heat engine. Therefore, in order to increase efficiency within a practical range, a double-effect refrigerating system may be used, so that the temperature and concentration of the absorbent solution in the high-temperature regenerator reach about 160° C. and 65 wt %, respectively. The absorbent solution becomes more corrosive for materials such as steel, copper, CuNi, as the temperature and concentration rise.

Well-known corrosion inhibitors mainly directed to steel materials include chromates, nitrates and molybdates. It is generally known that these corrosion inhibitors are added to an absorbent solution together with an alkali metal hydroxide to form an anticorrosive film on the material surface of an absorption chiller-heater once operated.

However, chromates have the problem of pitting due to their excessively strong oxidative power, and nitrates also have the problem of pitting and corrosion of copper materials. Molybdates have little danger of pitting because their oxidative power is too weak to raise corrosion potential in steel materials to a level where pitting would occur. However, an absorbent solution containing a molybdate corrosion inhibitor alone or an anticorrosive film-forming method according to the prior art does not form a sufficiently good anticorrosive film and may cause a problem of deterioration in refrigerating capacity under the influence of hydrogen gas generated by continuous corrosion reaction, because the molybdate may be dissolved in the lithium bromide absorbent solution only at a low level.

Recently, mixed-type corrosion inhibitors based on molybdates have also been developed and employed. Corrosion inhibitors to be mixed with molybdates include chromates, nitrates, borates, etc. However, such mixed-type corrosion inhibitors are not superior in anticorrosive power to molybdates alone, but involve the problem of pitting or crevice corrosion.

According to the prior art, a good anticorrosive film could not be formed in an assembled absorption chiller-heater using a corrosion inhibitor comprising a molybdate alone. Thus, the anticorrosive film formed was incomplete and a large amount of hydrogen gas is generated by corrosion reaction. If the amount of hydrogen gas generated exceeds the capacity of the bleeder of an absorption chiller-heater, the hydrogen gas will remain as non-condensed gas in the chiller-heater to inhibit absorption or evaporation action, thus causing a deterioration in refrigerating capacity. Even if the capacity of the bleeder were enhanced, the large amount of hydrogen gas would be generated by corrosion reaction, and would produce corrosion products (sludge) according to the amount of hydrogen gas. When accumulation of sludge in the chiller-heater becomes high, it blocks circulation of the absorbent solution in a solution heat exchanger or the like to hinder operation of the absorption chiller-heater.

It has been recognized in the prior art that molybdates are better corrosion inhibitors free from pitting or crevice corrosion as compared with chromates and nitrates. However, the problem of evolution of a large amount of hydrogen gas or the like has not been solved, because the disadvantage of the low level of molybdates which may be dissolved in absorbent solutions was not sufficiently improved or investigated to perfectly protect an assembled absorption chiller-heater with molybdates against corrosion. Global considerations including absorbent solution formula, steel parts surface on which an anticorrosive film is to be formed, initial anticorrosive film-forming method and other factors would naturally be required to form a good anticorrosive film in an absorption chiller-heater, but no such comprehensive solutions have been considered to date.

There are two reasons why a good anticorrosive film can not be formed with molybdates in an assembled absorption chiller-heater in the prior art. One is that the concentration of molybdates in absorbent solutions was lower than the required level during the initial anticorrosive film-forming period. The second reason is that the surface state of the steel parts on which an anticorrosive film is to be formed was not considered despite of a low oxidative power of molybdates.

Especially, the surface state of the steel parts on which an anticorrosive film is to be formed should be optimally prepared for molybdates, because the surface state influences not only the amount of hydrogen gas generated during the initial anticorrosive film-forming period but also the amount of hydrogen gas generated per unit time during later stages in an absorption chiller-heater. As used herein, the term "initial anticorrosive film-forming period" means a period from the start of formation of an anticorrosive film to the time at which the amount of hydrogen gas generated per unit time exponentially decreases to reach an almost stable level.

The reason why the above two problems have not been satisfactorily solved seems to exist in rare consciousness of those problems because previously common corrosion inhibitors such as chromates or nitrates have high solubility in absorbent solutions and a high oxidative power.

In view of the above prior art, it is an object of the present invention to explain the relation of three conditions consisting of absorbent solution formula conditions, steel parts surface conditions and initial film-forming conditions by performing various basic corrosion tests and various practical corrosion tests using a molybdate as a single corrosion inhibitor, to select optimal combination of the conditions of absorbent solution, steel parts surface on which an anticorrosive film is to be formed and operation for forming a good initial anticorrosive film in an assembled absorption chiller-heater, and thereby to provide an absorption chiller-heater in which an anticorrosive film with a very high anticorrosive power is formed and a method for forming such an initial anticorrosive film.

SUMMARY OF THE INVENTION

In order to solve the above problems, the present invention provides an absorption chiller-heater having steel parts and containing an absorbent solution comprising lithium bromide as its main component and containing a lithium molybdate corrosion inhibitor, wherein at least a part of the steel parts contacting with the absorbent solution includes a bare metal surface having an arithmetic mean surface roughness of not more than 1.0 μm, which surface has then been coated with lithium molybdate whereby a lithium molybdate film having high anticorrosive power is formed on the surface.

Further, another embodiment of the present invention provides a process for forming an initial anticorrosion film in an absorption chiller-heater having steel parts and containing an absorbent solution comprising lithium bromide as its main component and containing a lithium molybdate corrosion inhibitor, the process comprising assembling an absorption chiller-heater, wherein at least a part of the steel parts of the absorption chiller-heater contacting with an absorbent solution at a temperature higher than 100° C. has a bare metal surface having an arithmetic mean surface roughness of not more than 1.0 μm; introducing into the assembled chiller-heater an absorbent solution comprising lithium bromide as its main component and containing a lithium molybdate corrosion inhibitor dissolved in the solution at a level of 450–750 ppm; and conducting an initial anticorrosion film forming operation by operating the chiller-heater at a condition such that an amount of the lithium molybdate dissolved in the absorbent solution contained in the chiller-heater is maintained at not less than 200 ppm, to thereby form a lithium molybdate film having very high anticorrosion ability on the surface.

The absorbent solution for absorption chiller-heater used in the method for forming an initial anticorrosive film according to the present invention preferably comprises lithium bromide at a concentration of 46–49 wt %, and contains lithium molybdate dissolved in the solution at a level of 450–750 ppm and lithium hydroxide at a level of 0.03–0.1 wt %, and further contains a minor amount of a surfactant and the balance of water.

In the absorption chiller-heater according to the present invention, the steel material having an arithmetic mean surface roughness of not more than 1.0 μm can be obtained by machining the steel material surface by polishing, grinding or drawing, or by subjecting the steel material surface to bright heat treatment in a protective atmosphere or in vacuo. Such a steel material is preferably used as steel parts constituting at least a part of a high-temperature regenerator, low-temperature regenerator or high-temperature heat exchanger of the absorption chiller-heater.

The initial anticorrosive film-forming process is conducted at an absorbent solution temperature in the high-temperature regenerator of not less than 130° C., and the amount of the lithium molybdate corrosion inhibitor dissolved in the absorbent solution is maintained at not less than 200 ppm by conducting an intermittent dilution operation to maintain concentration of lithium bromide in the solution at 46–49 wt %, or by conducting a partial load continuous cooling operation or a continuous heating operation.

The arithmetic mean roughness (Ra) is in accordance with JIS B 0601, and the cutoff value and evaluation length are also standard values according to the JIS.

EXAMPLE 1.

Figure 11:
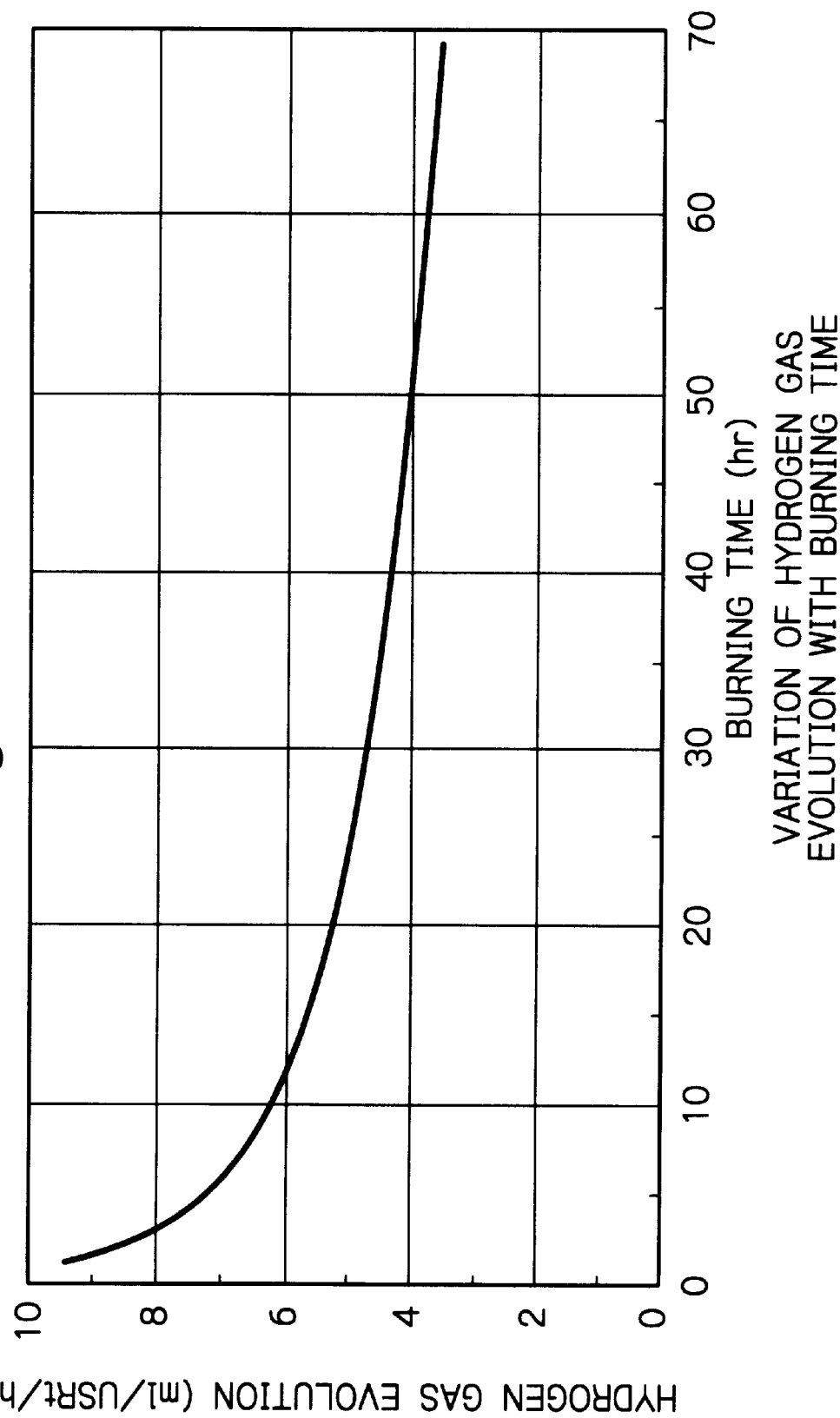

FIG. 11 is a graph showing variation of the amount of hydrogen gas generated with burning time in Example 2.

Figure 12:
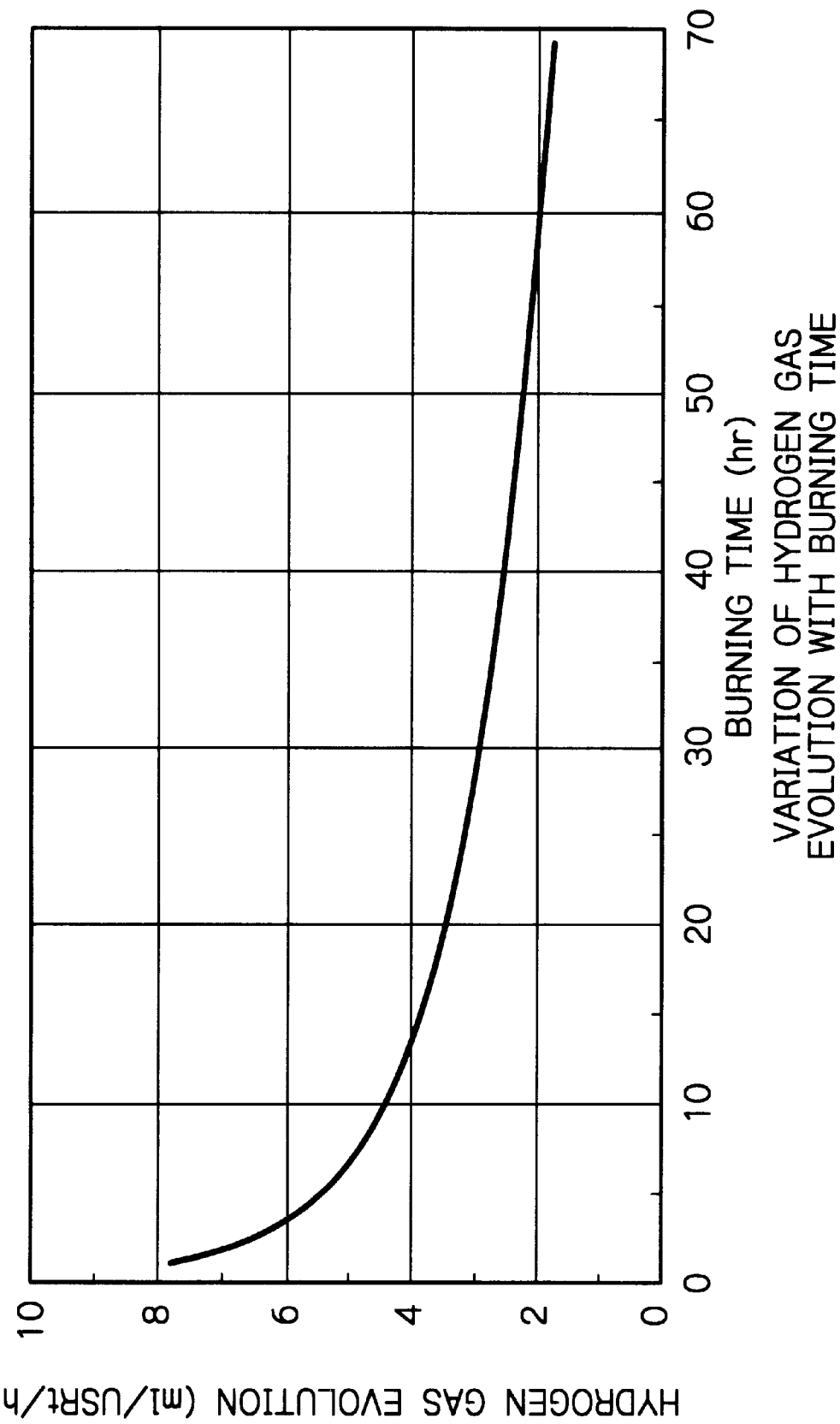

FIG. 12 is a graph showing variation of the amount of hydrogen gas generated with burning time in Example 3.

DETAILED DESCRIPTION OF THE INVENTION

The present invention will now be explained in detail.

The present invention resides in providing conditions of an absorbent solution for an absorption chiller-heater, a surface of steel parts on which an anticorrosive film is to be formed and an initial anticorrosive film-forming operation, for the purpose of forming a very good anticorrosive film in an assembled absorption chiller-heater.

According to the present invention, an amount of lithium molybdate required during the initial anticorrosive film-forming period can be supplied to a steel material surface on which an initial anticorrosive film is to be formed and an amount of lithium molybdate required for maintaining an anticorrosive film-retaining environment can be supplied to the steel parts surface on which the initial anticorrosive film has been formed, by introducing into an assembled absorption chiller-heater an absorbent solution for the absorption chiller-heater comprising LiBr at a concentration of 46–49 wt %, and containing lithium molybdate dissolved in the solution at a level of 450–750 ppm, lithium hydroxide at 0.03–0.1 wt % and a minor amount of a surfactant.

At least a part of the surface of the steel parts constituting an absorption chiller-heater and the surface of the steel parts incorporated in the chiller-heater, on which an initial anticorrosive film is to be formed, includes a bare metal surface having a surface roughness of not more than 1.0 μm as expressed in arithmetic mean roughness. Such a surface may be obtained by machining the surface of the steel material, for example, grinding, polishing or drawing it, or subjecting the surface of the steel material to bright heat treatment in a reducing or neutral atmospheric gas. A steel material surface obtained by bright heat treatment has substantially no oxide film, or even if it has oxide film, the oxide film will not prevent lithium molybdate from forming an initial anticorrosive film because it is limited to a film thickness of about 100 angstroms. Said steel material surface is as smooth as expressed in arithmetic mean roughness of 1.0 μm or less. The steel material surfaces as mentioned above are suitable for forming a very good and fine initial anticorrosive film even with a less oxidative corrosion inhibitor such as molybdates. As used herein, the term "steel material having bare metal surface" includes a steel material having exposed bare metal surface by subjecting the material to grinding, polishing or drawing to thereby expose its metal bare surface, as well as a steel material subjected to a bright heat treatment.

Operation conditions for forming an initial anticorrosive film involve using the above-mentioned absorbent solution and operating the chiller-heater while keeping the level of lithium molybdate, which is a necessary solution component for forming an initial anticorrosive film, dissolved in the absorbent solution at not less than 200 ppm to the above-mentioned steel parts surfaces. The absorbent solution temperature is 130° C. or more, at which an anticorrosive magnetite ($Fe_3O_4$) film is formed. The initial anticorrosive film-forming period means a period from the start of formation of an initial anticorrosive film to the time at which the amount of hydrogen gas generated per unit time exponentially decreases to reach an almost stable hydrogen evolution level. The initial anticorrosive film-forming period widely varies with the state of the surface to be treated. If the state of the surface to be treated is not suitable, the amount of hydrogen gas generated remains unattenuated, or somewhat decreases and then stabilizes but continues to be considerable without attaining a practical level. The initial anticorrosive film-forming period is within about 25 hours under optimal conditions of the absorbent solution, steel parts surface state and initial anticorrosive film-forming operation for lithium molybdate corrosion inhibitor.

Solution conditions required during the initial anticorrosive film-forming period involve keeping the level of lithium molybdate dissolved in the absorbent solution at not less than 200 ppm. The level of lithium molybdate dissolved in the absorbent solution sometimes more or less, depending on the structure of the absorption chiller-heater or the like, falls below 200 ppm in case of long-term fully loaded cooling operation or the like. This is because, during cooling operation, water contained in the absorbent solution is separated and reserved in an evaporator, by which concentration of lithium bromide in the solution increases, whereby solubility of lithium molybdate in the lithium bromide absorbent solution is lowered. In such a case, precipitated lithium molybdate can be dissolved out to restore the level of lithium molybdate dissolved in the absorbent solution by reducing the concentration of lithium bromide in the absorbent solution for the absorption chiller-heater to 46–49 wt % even in the course of operation.

Convenient operation conditions for the initial anticorrosive film-forming period further include a partially loaded continuous cooling operation and a heating operation. By conducting a partially loaded continuous cooling operation, average concentration of the absorbent solution in the refrigerating system is shifted to lower concentration, whereby a larger amount of lithium molybdate circulates in the absorption chiller-heater than under rated cooling operation (100% refrigeration load operation) so that the dissolved level of lithium molybdate in the circulating absorbent solution can be kept at not less than 200 ppm. Further, by conducting heating operation, average temperature of the absorbent solution in the chiller-heater becomes higher, so that lithium molybdate precipitated in the absorption chiller-heater is dissolved out in the absorbent solution, whereby a larger amount of lithium molybdate circulates in the absorption chiller-heater so that the dissolved level of lithium molybdate in the circulating absorbent solution can be kept at not less than 200 ppm.

A method for forming an initial anticorrosive film according to the present invention is explained in detail with reference to an actual absorption chiller-heater.

Figure 1:
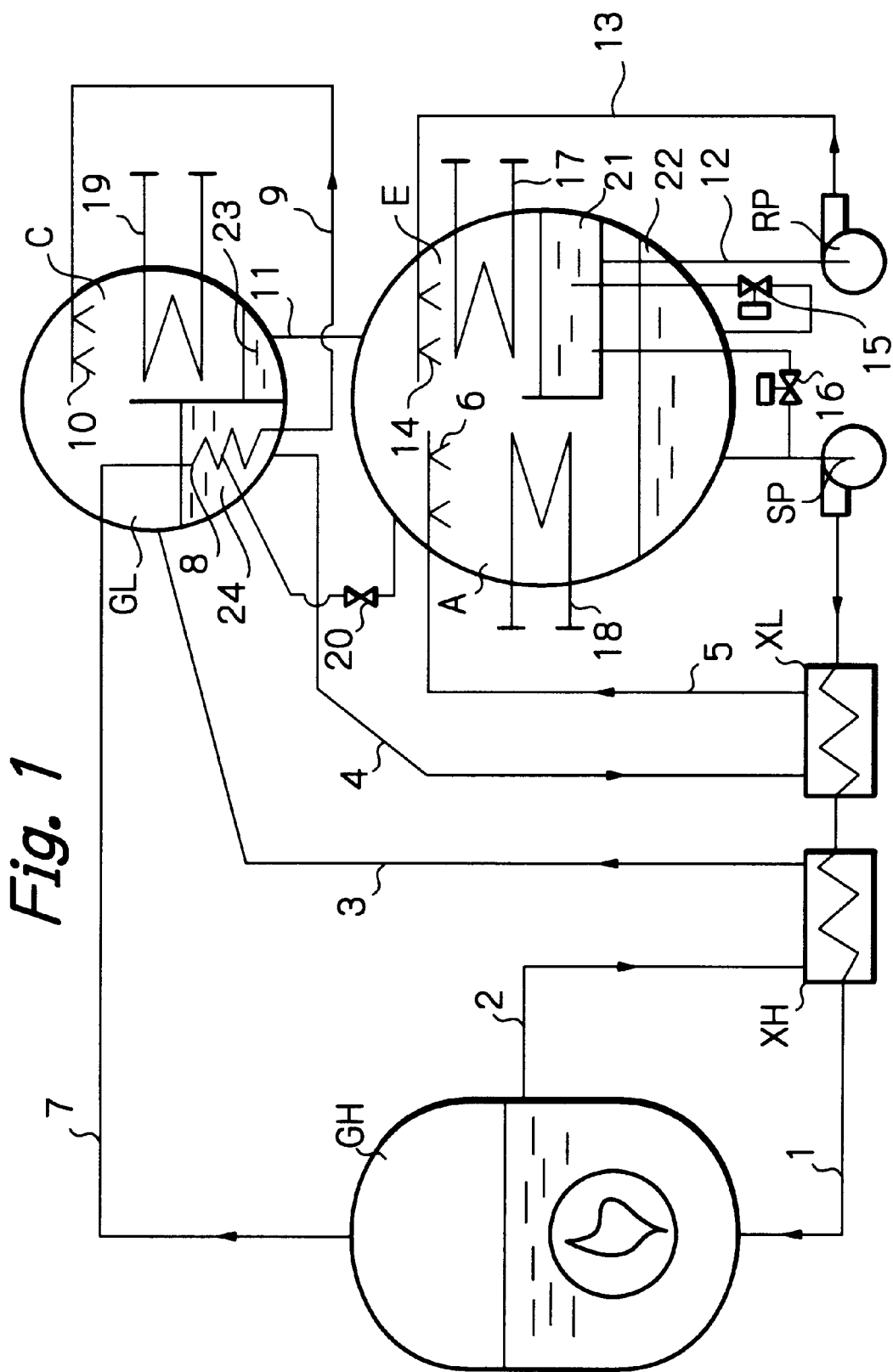
FIG. 1 is a cycle flow diagram of one embodiment of a double effect absorption chiller-heater which may be used for a method for forming an anticorrosive film according to the present invention.

An absorption chiller-heater is at first explained with reference to a drawing. FIG. 1 is a cycle flow diagram of a double-effect absorption cold or hot water generating machine as one type of absorption chiller-heaters. FIG. 1 shows major seven components, i.e. high-temperature regenerator GH, low-temperature regenerator GL, absorber A, evaporator E, condenser C, high-temperature heat exchanger XH and low-temperature heat exchanger XL. Main steel parts used in the machine are steel, copper and copper alloys.

The function of each component during a cooling operation is explained. The high-temperature regenerator GH heats a lithium bromide absorbent solution coming from the absorber A to remove water (refrigerant) and concentrate the solution. In a cooling operation at maximum load, the lithium bromide absorbent solution is concentrated into about 60–65 wt %. The temperature of the lithium bromide absorbent solution becomes to about 165° C. This is the most severe corrosion environment in an absorption chiller-heater. The heating source is combustion by a gas or kerosene or steam. The low-temperature regenerator GL heats a dilute solution of the lithium bromide absorbent solution with steam generated from the high-temperature regenerator GH.

In the absorber A, steam of the water refrigerant is absorbed in a concentrated lithium bromide absorbent solution.

In the evaporator E, the water refrigerant is evaporated to generate cold heat.

In the condenser C, steam of the water refrigerant is condensed.

The high-temperature heat exchanger XH and the low-temperature heat exchanger XL conduct heat exchange between lithium bromide absorbent solutions at different temperature levels to increase heat efficiency.

Various components are connected to each other and designed to establish a refrigeration cycle or a heating cycle in a closed system. For a heating operation, the cycle is organized as a boiler.

The flow in the double-effect absorption cold or hot water generating machine shown in FIG. 1 in cooling operation is explained below.

During operation of the absorption cold or hot water generating machine shown in FIG. 1, in the absorber A, concentrated absorbent solution (lithium bromide solution) is sprayed from a spray nozzle 6, so that refrigerant (water) is absorbed in the absorbent solution. Diluted lithium bromide solution which has absorbed the refrigerant water is reserved in absorbent solution reservoir 22 of the absorber A, and then, by means of the solution pump SP, pumped through the low temperature heat-exchanger XL and high temperature heat-exchanger XH, where the solution is heated. Then the solution is heated in the high temperature regenerator GH, where refrigerant water is evaporated out as steam, whereby concentrated lithium bromide solution is obtained. The concentrated lithium bromide solution is forwarded via line 2 through the high temperature heat-exchanger XH, where the solution is cooled. Then the solution is led to the low temperature regenerator GL, and reserved in absorbent solution reservoir 24 of the low temperature regenerator GL. In the low temperature regenerator GL, steam of refrigerant generated in the high temperature regenerator GH and led through line 7 and refrigerant line 8 heats concentrated lithium bromide solution in the absorbent solution reservoir 24, the heated solution is then led through line 4 to low temperature heat-exchanger XL. Steam of refrigerant cooled in the low temperature regenerator GL is led through line 9 and sprayed from refrigerant spray nozzle 10 of condenser C, and cooled and condensed on cooling water line 19. Condensed refrigerant water is reserved in refrigerant water reservoir 23 of condenser C, and led through line 11 to refrigerant reservoir 21 of evaporator E. Then the refrigerant water is pumped by refrigerant pump RP through lines 12 and 13 and then sprayed from spray nozzle 14 of evaporator E which is maintained at a reduced pressure. Sprayed refrigerant water is evaporated on heat exchanging tube of cold-hot water line 17, whereby cold water in cold-hot water line 17 is chilled by vaporization cold heat, which is supplied for cooling. Evaporated refrigerant is introduced into absorber A, and absorbed in absorbent solution as mentioned above.

When heating operation is conducted, valve for heating cycle 20 and dilution valve 15 are opened. Steam generated in high temperature regenerator GH is led through lines 7 and 8, and then valve 20, to evaporator E. In evaporator E, steam is condensed on heat exchanging tube of cold-hot water line 17, whereby hot water in cold-hot water line 17 is heated by condensation heat, which is supplied for heating.

In the absorption chiller-heater of the present invention, refrigerant water reservoir 21 of evaporator E and absorbent solution reservoir 22 of absorber A is connected with line and valve 15 is provided in the line. Also refrigerant water reservoir 21 of evaporator E and absorbent line is connected with line and valve 16 is provided in the line. Valve 15 is used for adding a portion of refrigerant water in refrigerant reservoir 21 to absorbent solution to dilute absorbent solution. It is generally used for lowering concentration of absorbent solution when operation of chiller-heater is discontinued, to thereby inhibit the absorbent solution from crystallizing during discontinuance period of the chiller-heater. Valve 16 is used for adding all of refrigerant water in refrigerant reservoir 21 to absorbent solution to thereby dilute absorbent solution to its initial state.

Intermittent dilution operation for lowering concentration of lithium bromide in the absorbent solution in the chiller-heater to 46–49 wt % to thereby increase amount of lithium molybdate dissolved in the absorbent solution, is conducted by stopping burning of high temperature regenerator and opening dilution valve 16, and continuing operation of chiller-heater. Thus, all of refrigerant water in refrigerant reservoir 21 is added to absorbent solution, so that concentration of lithium bromide in the absorbent solution is lowered to its initial concentration, that is 46–49 wt %. As a result, precipitated lithium molybdate becomes dissolved into lithium bromide absorbent solution, to there by increase level of lithium molybdate dissolved in the absorbent solution to not less than 200 ppm. Depending on the structure of chiller-heater, if operation of chiller-heater is conducted from 30 minutes to one hour after burning of high temperature regenerator GH is stopped and valve 16 is opened, precipitated lithium molybdate precipitated is dissolved into the solution to accomplish concentration of lithium molybdate dissolved in the solution of not less than 200 ppm.

The lithium bromide absorbent solution is ordinarily supplied at 55 wt %. However, the solubility of lithium molybdate in the 55 wt % lithium bromide absorbent solution is as low as 50 ppm, and at most about 100 ppm if it is excessively dissolved (in which case, an excessive state lasts for some time). Lithium molybdate around 100 ppm is far insufficient for forming a good anticorrosive film. According to the present invention, the level of lithium molybdate dissolved in the absorbent solution can be kept at 450–750 ppm by regulating the concentration of the lithium bromide absorbent solution at 46–49 wt %, so that a sufficient amount of lithium molybdate for forming an anticorrosive film can be supplied to an absorption chiller-heater.

As to the steel parts surface on which an anticorrosive film is to be formed, at least a part of the steel material in contact with a lithium bromide absorbent solution at higher than 100° C. is provided with a bare metal surface having a surface roughness of not more than 1.0 $\mu$m expressed in arithmetic mean roughness. This is because the corrosiveness of the absorbent solution exponentially increases if the temperature of the absorbent solution exceeds 100° C. Specific examples of such a material include a steel material having undergone machining (polishing, grinding, drawing, etc.) on the steel material surface and having a surface roughness of not more than 1.0 $\mu$m expressed in arithmetic mean roughness, or a steel material having undergone bright heat treatment on the surface in a protective atmosphere or in vacuo and having a surface roughness of not more than 1.0 $\mu$m expressed in arithmetic mean roughness. Such a steel material constitutes a high-temperature regenerator GH, low-temperature regenerator GL and high-temperature heat exchanger XH. For example, at least a part of the following components may be constituted with the above steel material: In high temperature regenerator GH, inner surface of the body and surface of heat exchanging tube; In low temperature regenerator GL, inner surface of the body; In high temperature heat exchanger XH, inner surface of the body and surface of heat exchanging tube.

Conditions for initial anticorrosive film-forming operation are explained. The present invention is characterized by forming an initial anticorrosive film with a very high anticorrosive power during early operation stages in an assembled absorption chiller-heater. Operation conditions for forming an initial anticorrosive film involve two conditions, i.e. keeping the level of lithium molybdate dissolved in the absorbent solution circulating in an absorption chiller-heater at not less than 200 ppm, and maintaining the absorption solution temperature in the high-temperature regenerator at not less than 130° C.

The "dissolved level" as used herein is not equivalent to solubility "Solubility" means a "dissolved level" at a saturated state.

During ordinary operation of an absorption chiller-heater, the concentration of lithium molybdate dissolved in the lithium bromide absorbent solution is typically about 100 ppm. The absorbent solution has a varying concentration of 53–65 wt % and a varying temperature of 40–165° C. in the absorption chiller-heater. Lithium chromate or lithium nitrate circulates in the absorption chiller-heater in a state in which it is dissolved in a lithium bromide absorbent solution because of its high solubility in the solution. However, lithium molybdate is subject to repeat dissolution and crystallization during circulation in the absorption chiller-heater because of its low solubility in the lithium bromide absorbent solution. The level of lithium molybdate dissolved in a lithium bromide absorbent solution is generally about 100 ppm, although the circulation speed of an absorbent solution and structure of the chiller-heater vary with the individual absorption chiller-heater.

Even a concentration of lithium molybdate of only about 100 ppm in an absorbent solution suffices for practical use, after an initial anticorrosive film has already been formed.

However, significant amount of lithium molybdate is required during the initial anticorrosive film-forming period. Therefore, when the level of lithium molybdate originally dissolved in the absorbent solution is 100 ppm, the lithium molybdate is rapidly consumed to about 50 ppm during the initial anticorrosive film-forming period, so that a proper initial anticorrosive film can not be formed but also a large amount of hydrogen gas is generated. If the level of lithium molybdate dissolved in the absorbent solution ranges between 100 ppm and 400 ppm during the initial anticorrosive film-forming period, the corrosion-induced weight loss is smaller as the level becomes higher. Thus, an initial anticorrosive film with a very high anticorrosive power can be formed by keeping the level of lithium molybdate dissolved in the absorbent solution at not less than 200 ppm to control the concentration of lithium molybdate at 200–400 ppm. By lowering the concentration of the lithium bromide absorbent solution to 46–49 wt %, the level of lithium molybdate dissolved in the solution reaches about 400 ppm and remains at not less than 200 ppm for some time.

As to the temperature, it has been demonstrated by basic corrosion tests and practical corrosion tests that a good initial anticorrosive film is formed at an absorbent solution temperature (temperature of the solution in a high-temperature regenerator) of not less than 130° C.

Specific operation conditions for forming an initial anticorrosive film were described above, and basically involve increasing the solubility of lithium molybdate in the lithium bromide absorbent solution by lowering the concentration of the lithium bromide circulated in an absorption chiller-heater so that the level of lithium molybdate dissolved in the absorbent solution can be kept within a required concentration range.

The period for completing formation of an initial anticorrosive film is defined to be an operation period taken for the amount of hydrogen gas generated per unit time to stabilize. Under the conditions of absorbent solution, steel parts surface and initial anticorrosive film-forming operation according to the present invention, the period for completing formation of an initial anticorrosive film is about 25 hours.

The following examples illustrate the present invention. REFERENCE EXAMPLES 1–7 relate to basic tests for determining various conditions for the present invention, followed by EXAMPLES and COMPARATIVE EXAMPLES.

EXAMPLES

Reference Example 1: Basic Corrosion Test for Various Typical Corrosion Inhibitors 1) Experiment Procedure Various typical corrosion inhibitors were tested for anticorrosive power. This is a basic test. Condition of an absorbent solution in high-temperature regenerator was simulated in a Teflon-coated pot. Test pieces of steel were placed in the solution for a predetermined period to examine corrosion-induced weight loss of the test pieces.

2) Test Conditions (1) Test piece

Material: SS400 (rolled steel material according to JIS G 3101)

Size: 20×40×4 mm (rectangular)

Surface area of test piece: about 21 cm$^2$

Number of test pieces to be tested: 2

Surface conditions: polished with emery paper #600 to have an arithmetic mean roughness Ra=0.2 μm (according to JIS B 0601)

Washing means: with alcohol and acetone (2) Absorbent solution conditions (simulated solution conditions in a high-temperature regenerator)

Amount of absorbent solution: 750 ml

Concentration of lithium bromide: 65 wt %

Temperature of absorbent solution: 165° C.

Type and concentration of corrosion inhibitors to be examined:

| a) No addition of corrosion inhibitor | |
|---|---|
| b) Lithium chromate | 2200 ppm |
| c) Lithium nitrate | 400 ppm |
| d) Lithium borate | 400 ppm |
| e) Lithium molybdate | 400 ppm |

(The concentration of each corrosion inhibitor is based on 55% LiBr.)

Alkalinity: 0.1N

Dipping period: 144 hours

3) Test Method

The above test pieces were placed in a pot under the absorbent solution conditions described above for 144 hours, and then subjected to cathodic reduction to measure and compare corrosion-induced weight losses.

The data represent corrosion-induced weight loss per one test piece.

4) Test Results

Figure 2:
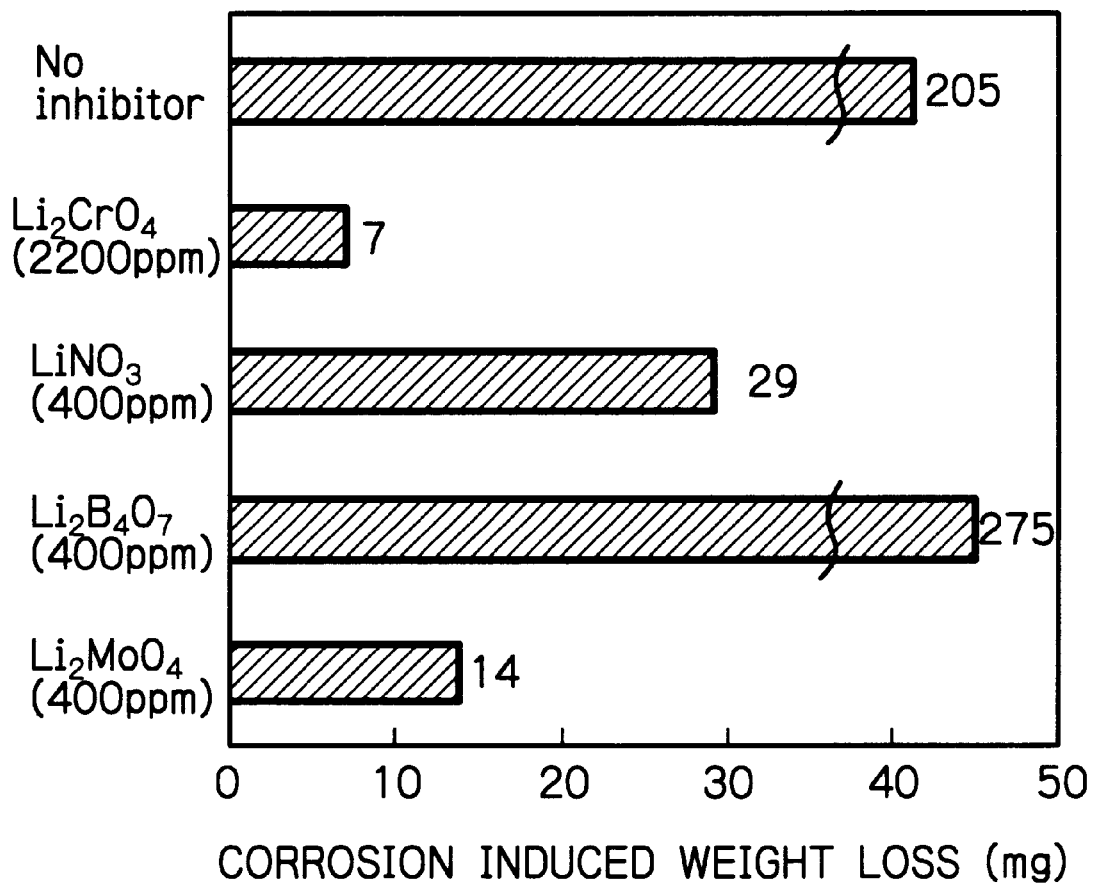
FIG. 2 is a graph showing the relation between various corrosion inhibitors and corrosion-induced weight losses.

Corrosion-induced weight loss per one test piece in the presence of various corrosion inhibitors is shown below and illustrated by a graph in FIG. 2.

| a) No addition of corrosion inhibitor: | 205 mg |
|---|---|
| b) Lithium chromate: | 7 mg |
| c) Lithium nitrate: | 29 mg |
| d) Lithium borate: | 275 mg |
| e) Lithium molybdate: | 14 mg |

These test results show that the corrosion-induced weight loss per one rectangular test piece (surface area was 21 cm$^2$) in the presence of lithium molybdate was 14 mg, which was twice the weight loss in the presence of lithium chromate but remarkably better than those obtained with the other corrosion inhibitors.

However, lithium molybdate is considered to be the most excellent corrosion inhibitor among them because lithium chromate and lithium nitrate may cause pitting.

Reference Example 2: Solubility of Li$_2$MoO$_4$ in a Lithium Bromide Absorbent Solution 1) Test Procedure In view of a greater influence of concentration factors than temperature factors of a lithium bromide absorbent solution on the solubility of Li$_2$MoO$_4$ in the lithium bromide absorbent solution, the variation of the solubility of Li$_2$MoO$_4$ in an absorbent solution was examined with varying concentrations of lithium bromide absorbent solution.

2) Test Sample

An aqueous lithium bromide solution at 55.42% (de-Ca product) containing Li$_2$MoO$_4$ crystal was used.

3) Test Method

At room temperature, 5.00 g of Li$_2$MoO$_4$ crystal was added to 200 g of a lithium bromide absorbent solution (55.42% lithium bromide, 0.1N-LiOH) in a 300 ml beaker, and the mixed solution was stirred for about one hour with a magnetic stirrer. About 10 ml of the solution was filtered through a filter (0.45 μm), and precisely 5.00 g of the filtered solution was weighed into a 50 ml graduated flask. This was 55.42% lithium bromide sample. The weight of the remaining solution in the beaker was measured and precisely 3.5 ml of water was added, and after a lapse of one hour, the solution was sampled in the same manner. The same procedure was repeated until the lithium bromide concentration in the beaker reaches a calculated value of about 45%. The measurement of the concentration of lithium molybdate was performed with ICP-AES (inductively coupled plasma-atomic emission spectroscopy) on the basis of a standard solution for atomic-absorption spectroscopy (Mo 1000 ppm).

4) Test Results

Figure 3:
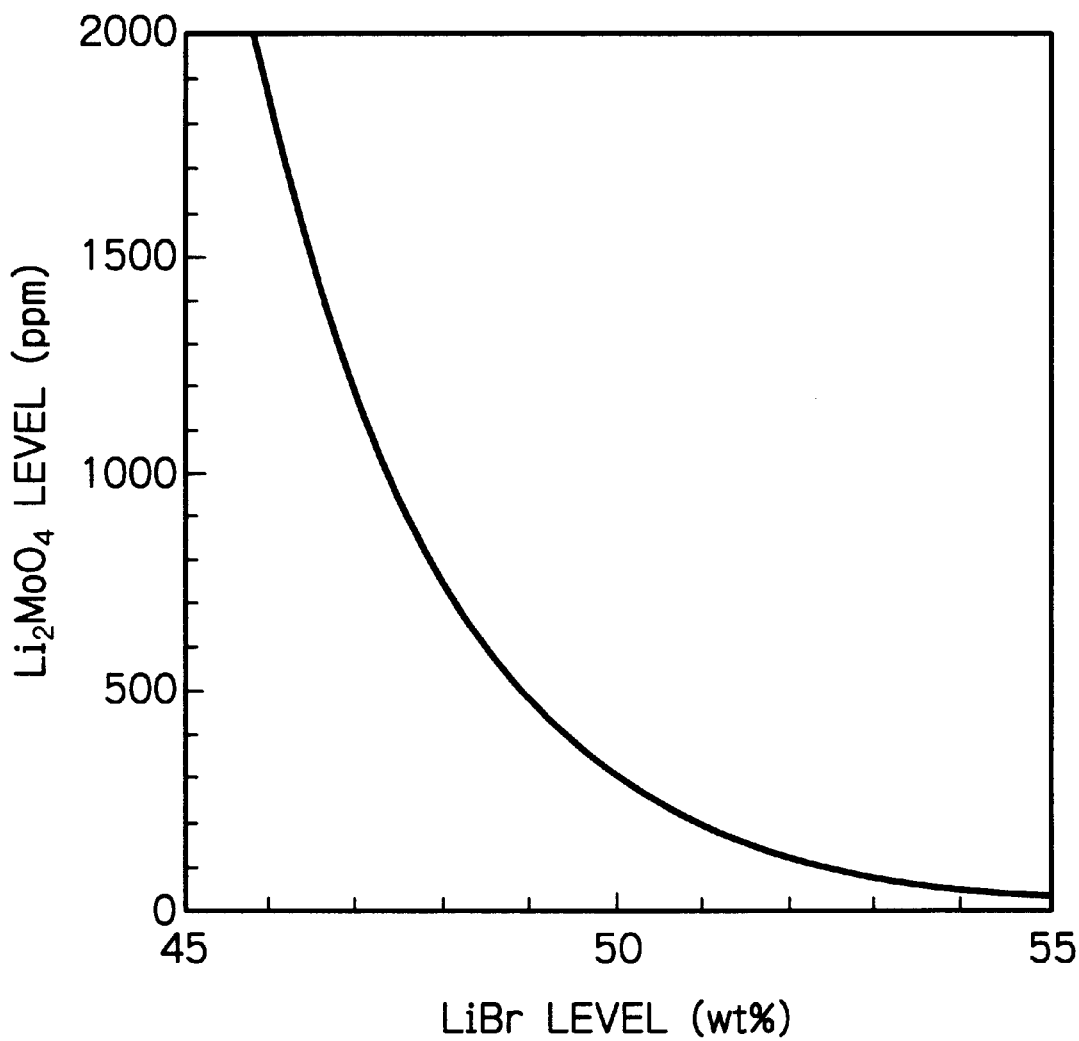
FIG. 3 is a graph showing the solubility of $Li_2MoO_4$ in a lithium bromide absorbent solution.

The results are shown in FIG. 3. FIG. 3 shows that the solubility of $Li_2MoO_4$ in the lithium bromide absorbent solution dramatically increases as the concentration of lithium bromide is diluted from 55%. The solubility of $Li_2MoO_4$ is strongly influenced by the concentration of the lithium bromide absorbent solution.

Thus, the solubility of lithium molybdate in the lithium bromide absorbent solution was found to dramatically increase once the concentration of the lithium bromide begins to fall below 50 wt %. For practical use in an absorption chiller-heater, it is preferable to choose a lithium bromide absorbent solution at 46–49 wt % to provide the level of lithium molybdate dissolved in the solution at around 450–750 ppm.

Reference Example 3: Influence of $Li_2MoO_4$ Level on Corrosion of Steel

1) Test Procedure

Among typical corrosion inhibitors, lithium chromate and lithium nitrate have a high solubility in lithium bromide absorbent solutions, while the solubility of lithium molybdate is much lower. Thus, the influence of varying levels of lithium molybdate on corrosion of steel was examined. The test was conducted by measuring corrosion-induced weight loss of test pieces under simulated solution conditions in a high-temperature regenerator.

2) Test Conditions (1) Test pieces

Material: SS400

Size: 20×40×4 mm (rectangular)

Surface area of test piece: 21 $cm^2$

Number of test pieces to be tested: 2

Surface conditions: polished with emery paper #600 to have an arithmetic mean roughness Ra=0.2 μm Washing means: with alcohol and acetone (2) Absorbent solution conditions (simulated solution conditions in a high-temperature regenerator)

Amount of absorbent solution: 750 ml

Concentration of lithium bromide: 65 wt %

Temperature of absorbent solution: 165° C.

Concentrations of lithium molybdate to be tested: 25, 50, 75, 100, 150, 200, 250, 300, 350 and 400 ppm (based on 55% LiBr)

(Note that lithium molybdate in each test was totally dissolved because the temperature of the absorbent solution is 165° C.)

Alkalinity: 0.1 N

Dipping period: 144 hours

3) Test Method

The above test pieces were placed in a pot under the absorbent solution conditions described above for 144 hours, and then subjected to cathodic reduction to measure and compare corrosion-induced weight losses.

The data represent corrosion-induced weight loss per one test piece.

4) Test Results

Figure 4:
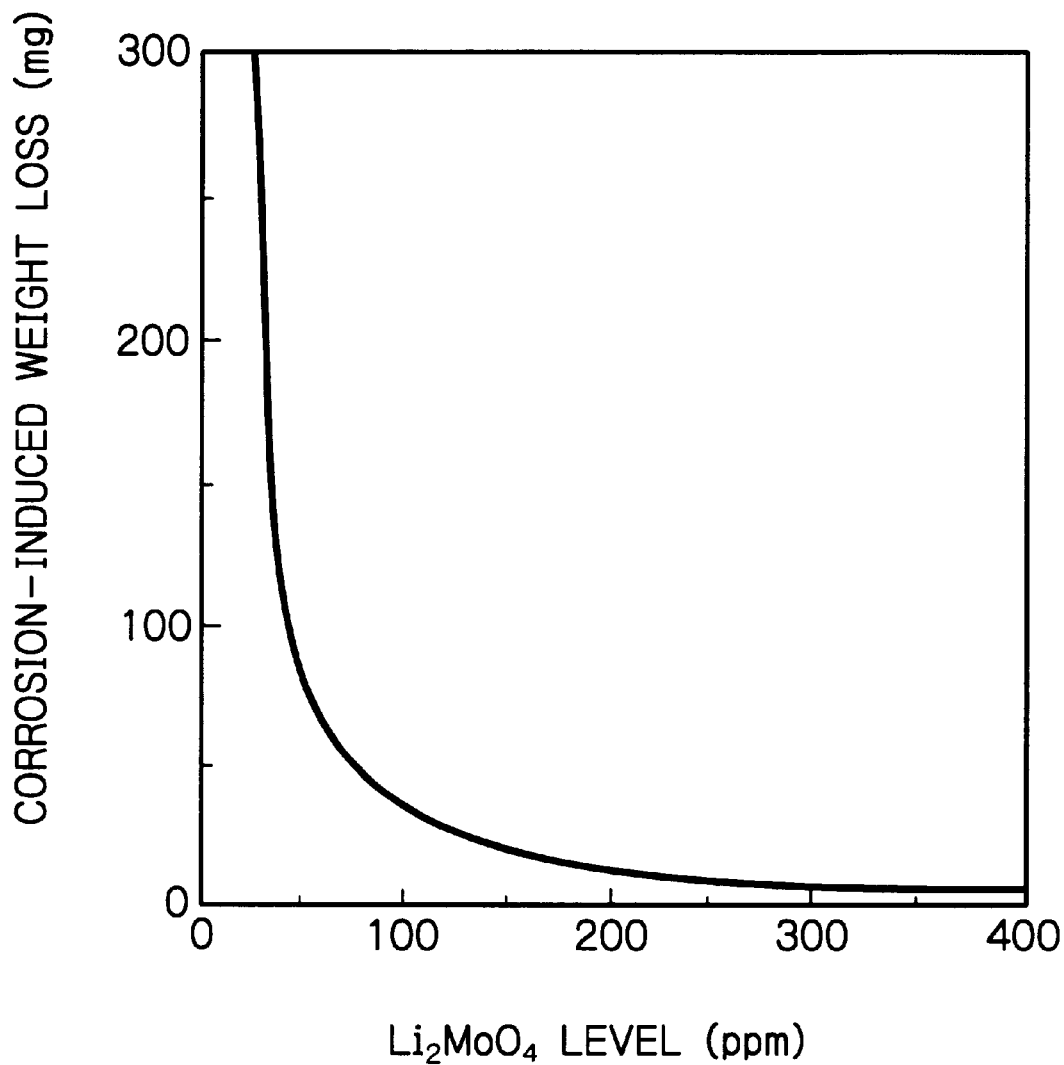
FIG. 4 is a graph showing the influence of $Li_2MoO_4$ level on corrosion of steel.

The results are shown in FIG. 4. FIG. 4 shows that corrosion-induced weight loss exponentially increases once the concentration of lithium molybdate falls below 100 ppm. For practical use, a concentration of not less than about 100 ppm is required. Within the range of 100–400 ppm, anti-corrosive effect becomes stronger as the concentration increases.

Reference Example 4: Influence of LiOH Level on Corrosion of Steel

1) Test Procedure

LiOH level was varied to measure corrosion-induced weight loss in test pieces of steel in the presence of lithium molybdate.

2) Test Conditions (1) Test pieces

Material: SS400

Size: 20×40×4 mm (rectangular)

Surface area of a test piece: 21 $cm^2$

Number of test pieces to be tested: 2

Surface conditions: polished with emery paper #600 to have an arithmetic mean roughness Ra=0.2 Em Washing means: with alcohol and acetone (2) Absorbent solution conditions (simulated solution conditions in a high-temperature regenerator)

Amount of absorbent solution: 750 ml

Concentration of lithium bromide: 65 wt %

Temperature of absorbent solution: 165° C.

Concentration of lithium molybdate: 400 ppm (based on 55% LiBr)

LiOH concentrations to be tested: 0.005, 0.01, 0.02, 0.04, 0.08, 0.1, 0.2 and 0.4 N Dipping period: 144 hours 3) Test Method The above test pieces were placed in a pot under the absorbent solution conditions described above for 144 hours, and then subjected to cathodic reduction to measure and compare corrosion-induced weight loss.

The data represent corrosion-induced weight loss per one test piece.

4) Test Results

Figure 5:
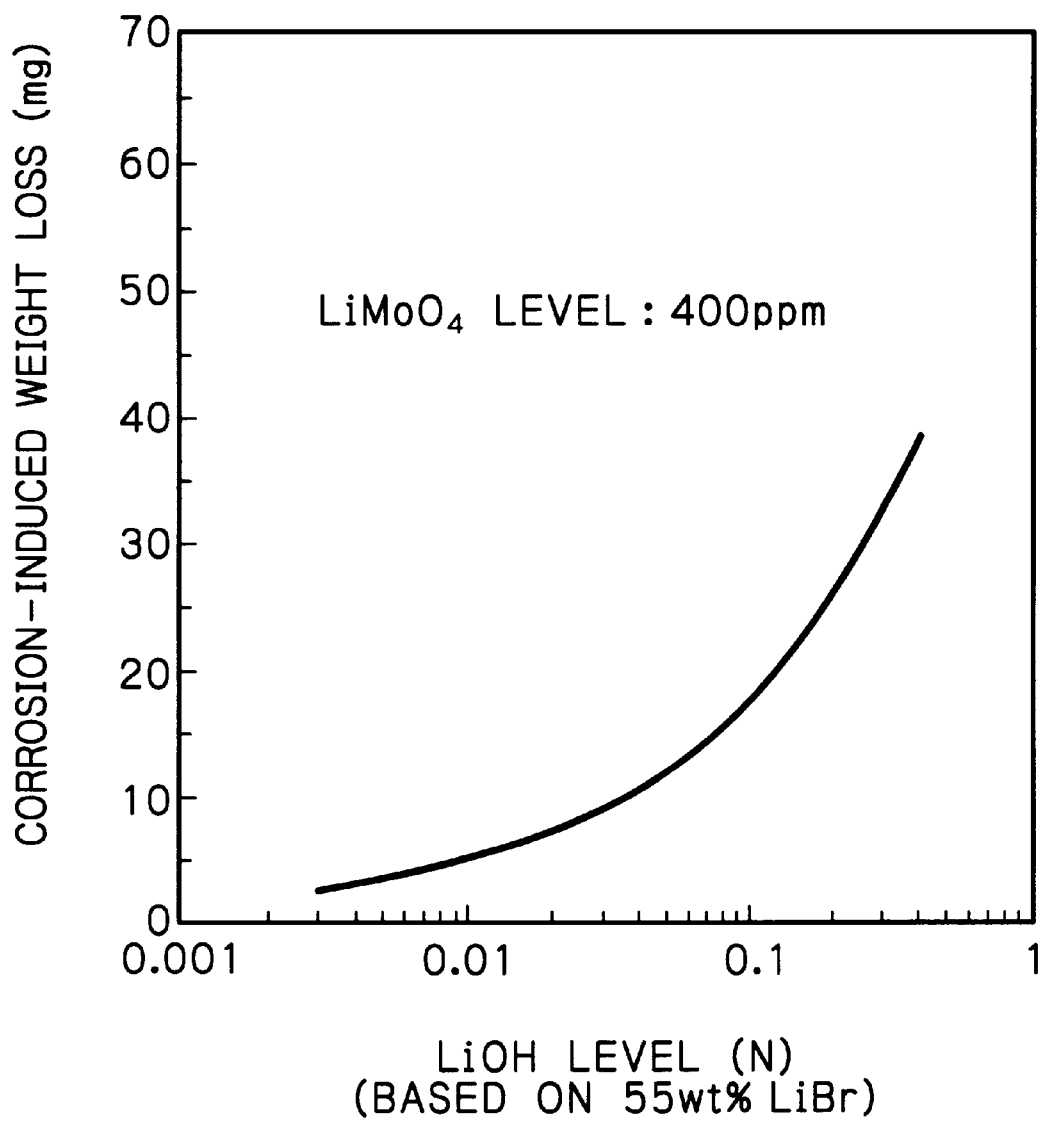
FIG. 5 is a graph showing the influence of LiOH level on corrosion of steel.

The results are shown in FIG. 5. The LiOH level (N) indicated, which was based on 55% LiBr, was slightly higher under the test solution conditions.

Within the range of test LiOH levels, corrosion-induced weight loss of test pieces decreased as the level becomes lower. At practical levels, the upper limit is 0.06 N.

Reference Example 5: Influence of LiOH Level on Corrosion of Copper

1) Test Procedure

Influence of LiOH level on corrosion of copper in the presence of lithium molybdate was examined. Test pieces were placed for a determined period under simulated solution conditions in a high-temperature regenerator with varying LiOH levels to measure corrosion-induced weight loss.

2) Test Conditions
   (1) Test pieces
   Material: C1201 (copper alloy material according to JIS H3300)
   Size: 20×40×4 mm (rectangular)
   Surface area of a test piece: 21 cm$^2$
   Number of test pieces to be tested: 2
   Surface conditions: polished with emery paper #600 to have an arithmetic mean roughness Ra=0.2 μm
   Washing means: with alcohol and acetone
   (2) Absorbent solution conditions (simulated solution conditions in a high-temperature regenerator)
   Amount of absorbent solution: 750 ml
   Concentration of lithium bromide: 55 wt %
   Temperature of absorbent solution: 140° C.
   Concentration of lithium molybdate: 100 ppm (based on 55% LiBr)
   Test LiOH levels: 0.005, 0.01, 0.02, 0.04, 0.08, 0.1, 0.2 and 0.4 N
   Dipping period: After dipping for 144 hours, corrosion-induced weight loss of test pieces was measured.

3) Test Method

The above test pieces were placed in a pot under the absorbent solution conditions described above for 144 hours, and then subjected to cathodic reduction to measure and compare corrosion-induced weight loss.

The data represent corrosion-induced weight loss per one test piece.

4) Test Results

Figure 6:
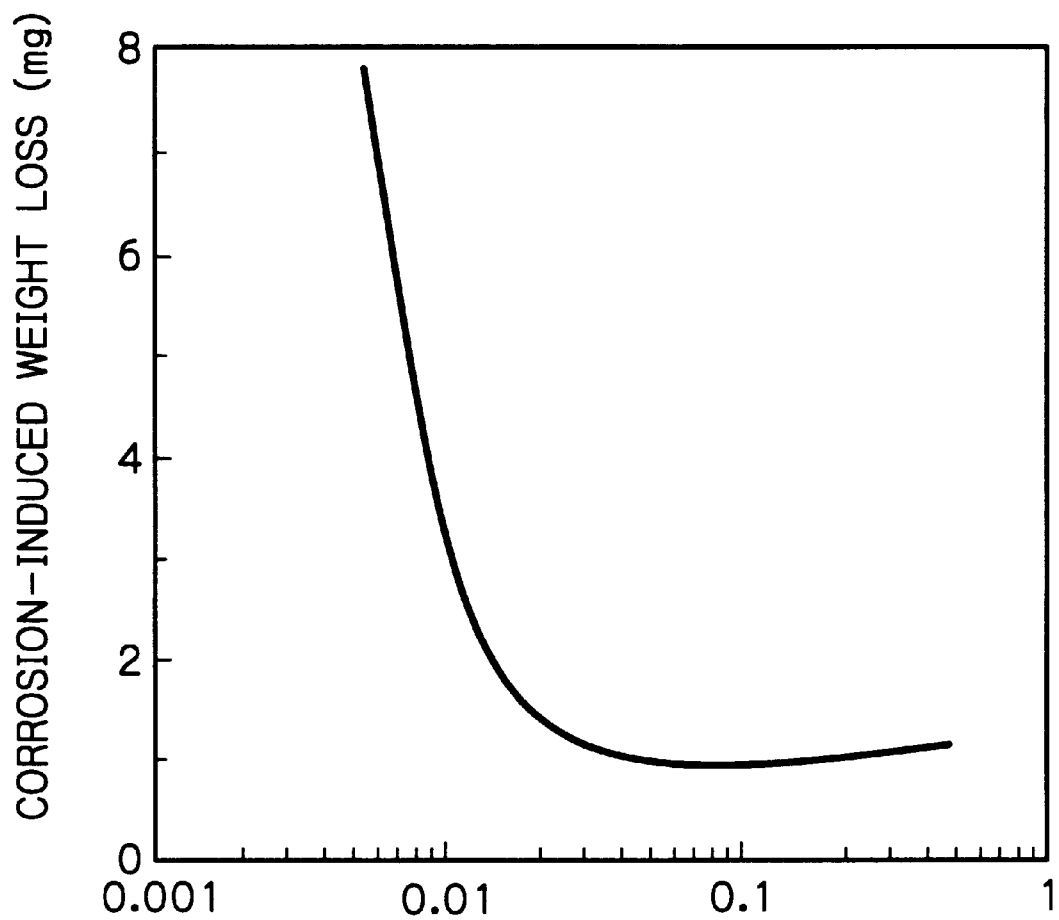
FIG. 6 is a graph showing the influence of LiOH level on corrosion of copper.

The results are shown in FIG. 6. FIG. 6 shows that corrosion-induced weight loss of copper exponentially increased at an LiOH level of 0.01 N or less. Within the range of tested LiOH levels, anticorrosive effect was very strong at the level of 0.03 N or more.

The results of REFERENCE EXAMPLES 4 and 5 show that the upper limit of LiOH level for steel materials is 0.06 N while the lower limit of LiOH level for copper materials is 0.03 N. An optimal range of LiOH level for both of steel and copper materials may be determined from both limits. An optimal alkalinity range was 0.03–0.06 N as expressed in LiOH level.

Reference Example 6: Comparison of Amounts of Hydrogen Gas Generated with Different Surface Conditions of Steel 1) Test Procedure Now that lithium molybdate was found to be an effective corrosion inhibitor. Then, basic corrosion tests were performed on test pieces having undergone several surface conditions to determine the most preferable steel surface condition. The amount of hydrogen generated from test pieces under simulated solution conditions in a high-temperature regenerator was measured.

2) Test Conditions
   (1) Test pieces
   Material: SS400
   Size: 50×60×4.5 mm
   Surface area of a test piece: 70 cm$^2$
   Number of test pieces to be tested: 6
   Surface conditions:
     a) Steel with mill scale (general steel of SS400)
     b) Polishing (finishing with emery paper #600, arithmetic mean roughness Ra=0.2 μm)
     c) Bright heat treatment: Surface of the test pieces were ground to remove mill scale, and then heated at 740° C. under nitrogen atmosphere to conduct stress relieving.
     d) Iron phosphate: Test pieces were immersed in 10% aqueous NaOH solution at 40–80° C. to conduct degreasing. Then, the test pieces were immersed in 16% aqueous phosphoric acid solution at 50° C. for 30 min–1 hr to form a film of iron phosphate, and then neutralized in a neutralization bath.
     e) Shot blasting: Shotblast FG-70 manufactured by Fukuyama Kyodo Koki; Shot: 0.7φ, crushed shape; pressure=7 kgf/cm$^2$; nozzle=φ8, EK-8 manufactured by Nicchu.
     f) Calcium zinc phosphate: Test pieces were treated with hydrochloric acid, and then immersed in a solution of FERICOAT 7 (calcium zinc phosphate solution manufactured by Nihon Parkerizing Co., Ltd) at 60° C. for 30 minutes to form a film, and then washed with water.
   Washing means: with alcohol and acetone
   (1') Tube test pieces
   Material: STB340 tube (steel boiler and heat exchanger tubes according to JIS G3461)
   Size: OD=27.2 mm; ID=20.8 mm; L=82.7 mm
   Number of test pieces to be tested: 6
   Surface area of test pieces: 70 cm$^2$
   Surface conditions: (g) Drawing: The tube test pieces were treated by drawing to have Ra=1.0 μm or less. The end surfaces were polished to have Ra=0.2 μm.
   (2) Absorbent solution conditions (simulated solution conditions in a high-temperature regenerator)
   Amount of absorbent solution: 750 ml
   Concentration of lithium bromide: 65 wt %
   Temperature of absorbent solution: 169° C.
   Concentration of lithium molybdate: 400 ppm (based on 55% LiBr)
   Test LiOH level: 0.03 N (based on 55% LiBr)
   Dipping period: 144 hours 3) Test Method After said test pieces were placed in a pot under the absorbent solution conditions described above for 144 hours, the solution temperature in the pot was lowered to 60° C. After partial vapor pressure dropped, the pot was evacuated by a vacuum pump to determine hydrogen gas issuing on the exhaust side by a wet gas flowmeter. The amount of hydrogen gas determined was generated from a total area of 420 cm$^2$ of the test pieces. The unit of the amount of gas generated is hereinafter expressed in ml under normal conditions (normal atmospheric pressure (1 atm.(0.101325 Mpa), 25° C.).

4) Test Results

Figure 7:
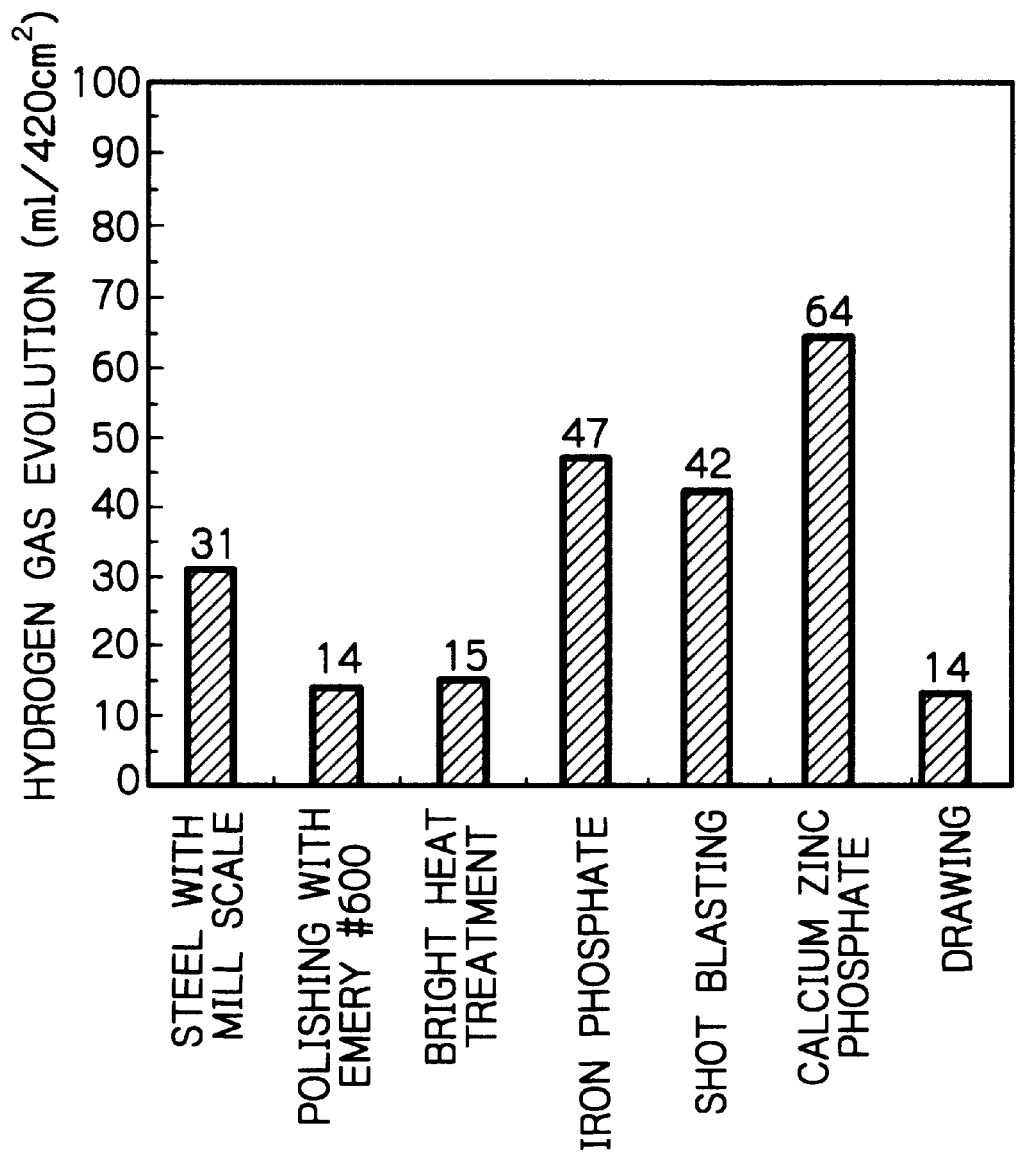
FIG. 7 is a graph showing the amount of hydrogen gas generated with various surface treatments.

The results are set forth below and illustrated in FIG. 7.
   a) Steel with mill scale: 31 ml
   b) Polishing: 14 ml
   c) Bright heat treatment: 15 ml
   d) Iron phosphate: 47 ml
   e) Shot blasting: 42 ml
   f) Calcium zinc phosphate: 64 ml
   g) Drawing: 14 ml The above results show that hydrogen gas evolution was more prominent (hydrogen gas evolution due to corrosion was more prominent) when the steel material surface was covered with a non- or low-protective film. Thus, 30–60 ml/420 cm$^2$ of hydrogen was generated in case of steel material surface types such as steel with mill scale, steel treated with iron phosphate and steel treated with calcium zinc phosphate. In contrast, much less amount of hydrogen gas was generated (14–15 ml/420 cm$^2$) in case of steel material surfaces showing bare metal surface having a more or less good surface roughness obtained by polishing or bright heat treatment or by drawing. Shot blasting seems to tend to form a corrosion cell because it generates a relatively large amount of hydrogen gas (42 ml/420 cm$^2$) with a poor surface roughness and some inhomogeneous hardening, though it shows a bare metal surface.

The test results are concluded as follows:
1) Steel material surface types showing a bare metal surface with a good surface roughness were the most suitable for a lithium molybdate corrosion inhibitor to form an anticorrosive film. Optimal steel material surface types were obtained by machining such as polishing or grinding, or by bright heat treatment, or by drawing. As used herein, the bright heat treatment means a heat treatment for steel materials in a protective atmosphere or in vacuo to protect a surface against high-temperature oxidation and decarburization and to keep a bright surface state. This term is defined in JIS B6905 or JIS G0201.
2) When the steel material surface was covered with a non-or less protective film, it hindered formation of an anticorrosive film and lead to a poor anticorrosive film with considerable gas evolution even if it is a thin film. (Iron phosphate film has a film thickness of only about 0.15 μm Reference Example 7: Correlation Between Surface Roughness (Ra) of Steel and Hydrogen Gas Evolution 1) Test Procedure The test in REFERENCE EXAMPLE 6 relating to "Comparison of amounts of hydrogen gas generated with different surface conditions of steel" revealed that optimal steel surface conditions for lithium molybdate corrosion inhibitor include a bright bare metal surface. Next, the correlation of different arithmetic mean roughnesses (Ra) with the amount of hydrogen gas generated is examined.

2) Test Conditions
  (1) Test pieces
  Material: SS400
  Size: 50×60×4.5 mm
  Surface area of a test piece: 70 cm$^2$
  Number of test pieces: 6
  Surface conditions:
  a) Polished surface: polished with emery paper to have Ra=0.1, 0.5, 1.0 μm
  b) Ground surface: treated by grinding to have Ra=2.0, 3.0, 4.0 μm
  c) Bright heat treated surface: treated in the similar manner as in EXAMPLE 1 to have Ra=0.1, 0.8 μm
  Washing means: with alcohol and acetone
  (2) Absorbent solution conditions (simulated solution conditions in a high-temperature regenerator)
  Amount of absorbent solution: 750 ml
  Concentration of lithium bromide: 65 wt %
  Temperature of absorbent solution: 169° C.
  Concentration of lithium molybdate: 400 ppm (based on 55% LiBr)
  Test LiOH level: 0.03 N (based on 55% LiBr)
  Dipping period: 144 hours
3) Test Method After the above test pieces were placed in a pot under the absorbent solution conditions described above for 144 hours, the solution temperature in the pot was lowered to 60° C. When partial vapor pressure dropped, the pot was evacuated with a vacuum pump to determine hydrogen gas issuing on the exhaust side by a wet gas flowmeter. The amount of hydrogen gas determined was generated from a total area of 420 cm$^2$ of each test piece.

4) Test Results

Figure 8:
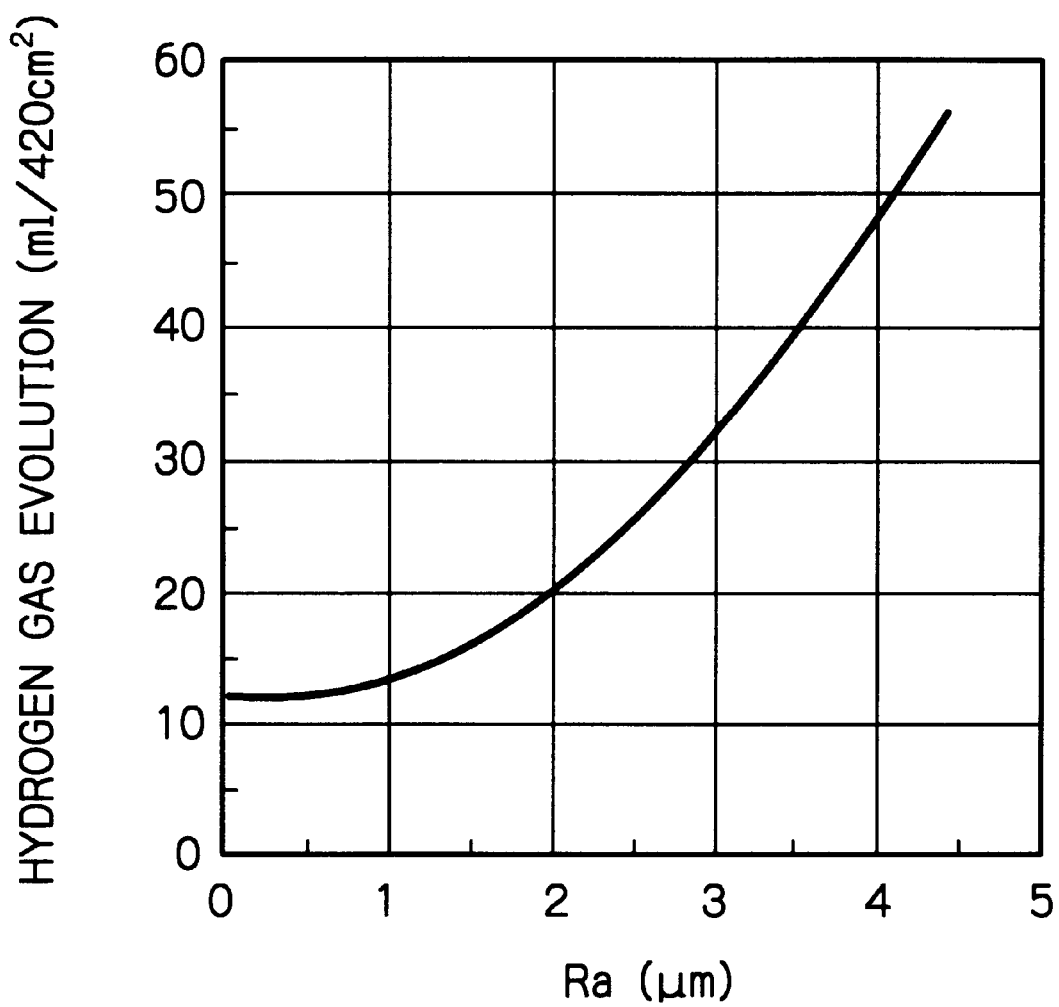
FIG. 8 is a graph showing the relation between surface roughness (Ra) and the amount of hydrogen gas generated.

The results are shown in FIG. 8. It shows that the amount of hydrogen gas generated was almost unchanged at Ra=1 μm or less but tended to increase above Ra=1 μm.

EXAMPLE 1: Practical experiment on an absorption chiller-heater using lithium molybdate as a corrosion inhibitor 1) Test Procedure The experiment of this example was a practical experiment on an absorption chiller-heater, wherein the level of lithium molybdate dissolved in the absorbent solution was controlled during the initial anticorrosive film-forming period and the steel material surface to be in contact with the absorbent solution in the absorption chiller-heater is optimally prepared for lithium molybdate.

The item to be measured was the amount of hydrogen gas generated per unit time during the initial anticorrosive film-forming period.

2) Experimental Conditions
  (1) Experimental apparatus: Double-effect direct fired absorption cold or hot water generating machine shown in FIG. 1 (50 USRt)
  (2) Operation condition: 100% loaded cooling operation
  (3) Formula for the absorbent solution used:
    a) Concentration of lithium bromide: 48 wt %
    b) Li$_2$MoO$_4$: 750 ppm
    c) LiOH: 0.03 N
  (4) Solution conditions in a high-temperature regenerator (100% loaded cooling operation):
    a) Concentration of lithium bromide: 64±1 wt %
    b) Temperature of absorbent solution: 164±1° C.
  (5) Experimental operation period: 70 hours
  (6) The concentration of the corrosion inhibitor was controlled during the initial anticorrosive film-forming period. 100% loaded cooling operation was conducted for 10 hours, at which concentration of lithium molybdate in the absorbent solution was decreased to around 300 ppm. Therefore, intermittent dilution operation was conducted by operating the chiller-heater while burning of high temperature regenerator GH is stopped and valve 16 was fully opened for one hour, to lower concentration of lithium bromide to 46–49 wt %, whereby concentration of lithium molybdate was increased to around 300 ppm. On and after the second test day, concentration of molybdate after 10 hours 100% cooling operation was decreased to near 200 ppm, and increased to around 300 ppm by the intermittent dilution operation. This procedure was repeated for 7 days. In such a manner, the level of lithium molybdate dissolved in the absorbent solution during the initial anticorrosive film-forming period was kept at not less than 200 ppm.
  (7) Condition of steel parts surface in contact with the absorbent solution in the absorption chiller-heater:

The steel parts surface to be in contact with the solution at 100° C. or more was a bare metal surface obtained by machining (such as cutting or grinding) or bright heat treatment and having a surface roughness of 1.0 μm or less expressed in arithmetic mean roughness. Specifically, in the high temperature regenerator GH, inner surface of the body was an SS400 steel material treated by polishing to have Ra=1.0 μm or less, and smoke tube was STB340 steel material treated by drawing to have Ra=1.0 μm or less; in the high temperature heat exchanger XH, inner surface of the body was SS400 steel material treated by polishing to have Ra=1.0 μm or less, and heat exchanging tube was STKM steel material (carbon steel tube for mechanical structure according to JIS G3445) treated by cold drawing and then conducted to bright heat treatment by heating it at 740° C. in nitrogen atmosphere to have Ra=1.0 μm or less.

3) Experimental Method

An assembled absorption chiller-heater was operated for forming an initial anticorrosive film and the amount of hydrogen gas generated per unit time during said formation was determined. Experimental conditions were described above. The operation period in this experiment was much longer than required for forming an initial anticorrosive film for the purpose of comparison with other experiments.

The absorption chiller-heater tested had a purge tank for trapping uncondensed gas. In the experiment, the purge tank was evacuated by a vacuum pump once per 30 minutes, and hydrogen gas issuing on the back pressure side was passed through a wet gas flowmeter (volumetric flowmeter) to determine the amount of hydrogen gas generated. The absorbent solution was also sampled to determine levels of the corrosion inhibitor, iron and copper in the solution.

For comparison between experiments, the following basic items were measured.

(1) Operation period taken for the amount of hydrogen gas generated per one hour to reach 1 ml/USRt (in view of the relation with the exhaust power of the exhaust system).

(2) The amount of hydrogen gas generated per one hour (ml/USRt/hr) after the initial anticorrosive film-forming process has been completed (operation period of 60 hours).

4) Experimental Results (1) Operation period taken for the amount of hydrogen gas generated per one hour to reach 1 ml/USRt was measured to be 25 hours.

(2) The amount of hydrogen gas generated per one hour after an initial anticorrosive film has been formed was measured to be 0.59 ml/USRt/hr.

Figure 9:
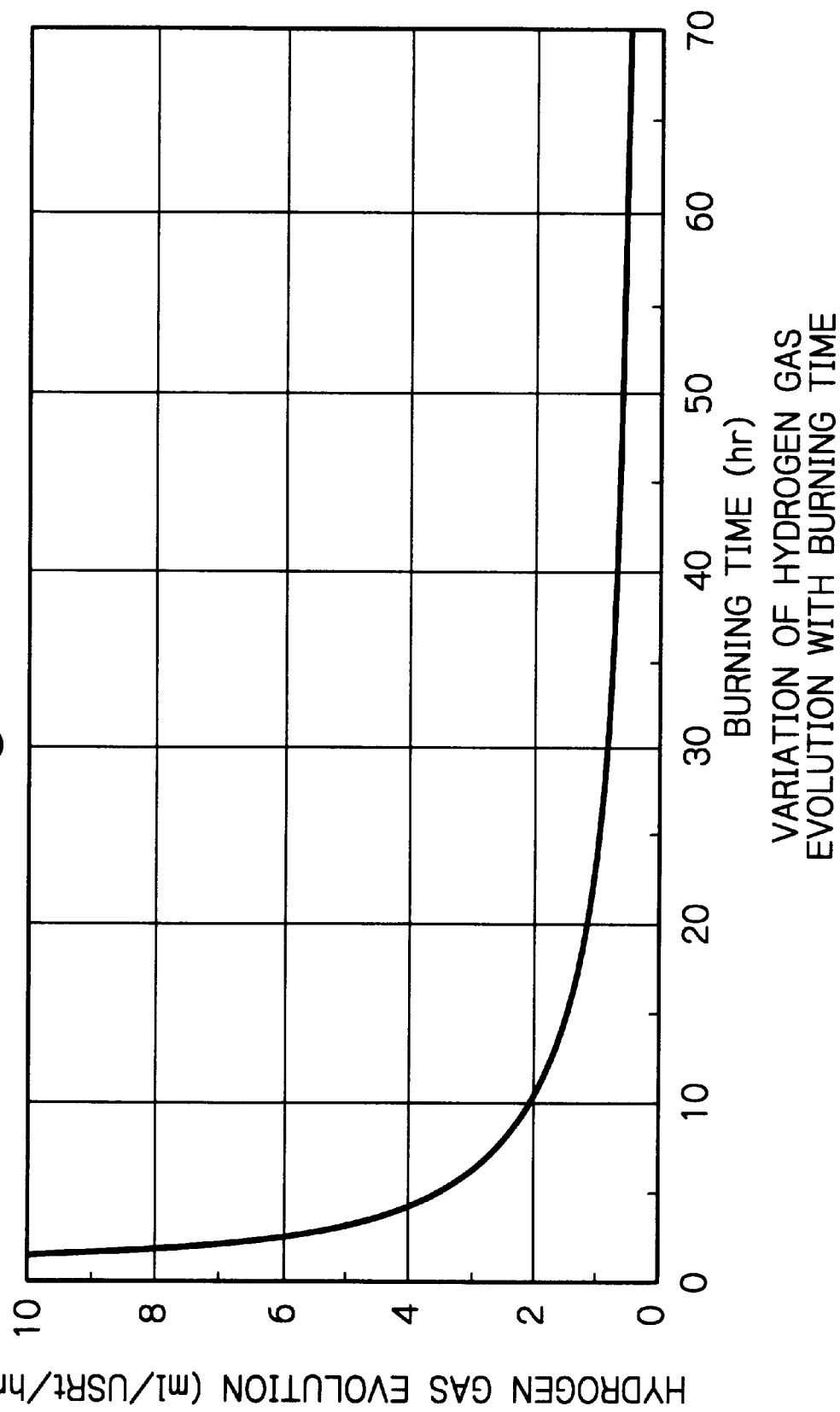
FIG. 9 is a graph showing variation of the amount of hydrogen gas generated with burning time in Example 1.

The results are shown in FIG. 9. It could be demonstrated that an initial anticorrosive film with a very high anticorrosive power could be formed by keeping the level of lithium molybdate dissolved in the absorbent solution at not less than 200 ppm and selecting the most suitable steel material surface conditions for lithium molybdate corrosion inhibitor during the initial anticorrosive film-forming period.

Comparative Example 1: Practical Experiment on an Absorption Chiller-heater Using Lithium Chromate as a Corrosion Inhibitor 1) Experimental Procedure For comparison with the practical experiment using lithium molybdate as a corrosion inhibitor, a practical experiment was performed on an absorption chiller-heater using lithium chromate as a control corrosion inhibitor. The experiment was performed on an actual absorption chiller-heater designed for use with lithium chromate. The steel material surface had a film of iron phosphate (having a thickness of about 0.1 μm).

The item to be measured was the amount of hydrogen gas generated per unit time during the initial anticorrosive film-forming period.

2) Experimental Conditions (1) Experimental apparatus: Double-effect direct fired absorption cold or hot water generating machine shown in FIG. 1 (50 USRt)

(2) Operation condition: 100% loaded cooling operation (3) Formula for the absorbent solution used:

a) Concentration of lithium bromide: 55 wt %
b) $Li_2CrO_4$: 2200 ppm
c) LiOH: 0.02 N (4) Solution conditions in a high-temperature regenerator (100% loaded cooling operation):

a) Concentration of lithium bromide: 64±1 wt %
b) Temperature of absorbent solution: 164±1° C.

(5) Experimental operation period: 70 hours (6) The concentration of the corrosion inhibitor was not controlled during the initial anticorrosive film-forming period.

(7) Steel parts surface to be in contact with the absorbent solution in the absorption chiller-heater was treated with iron phosphate.

3) Experimental Method

An assembled absorption chiller-heater was operated for forming an initial anticorrosive film and the amount of hydrogen gas generated per unit time during this period was determined. Experimental conditions were described above. The operation period in this experiment was much longer than required for forming an initial anticorrosive film for the purpose of comparison with other experiments.

The absorption chiller-heater tested had a purge tank for storing uncondensed gas. In the experiment, the purge tank was evacuated by a vacuum pump once per 30 minutes, and hydrogen gas issuing on the back pressure side was passed through a wet gas flowmeter (volumetric flowmeter) to determine the amount of hydrogen gas generated. The absorbent solution was also sampled to determine levels of the corrosion inhibitor, iron and copper in the solution.

For comparison between experiments, the following basic items were measured.

(1) Operation period taken for the amount of hydrogen gas generated per one hour to reach 1 ml/USRt (in view of the relation with the exhaust power of the exhaust system).

(2) The amount of hydrogen gas generated per one hour (ml/USRt/hr) after the initial anticorrosive film-forming process has been completed (operation period of 60 hours).

4) Experimental Results (1) Operation period taken for the amount of hydrogen gas generated per one hour to reach 1 ml/USRt was measured to be 15 hours.

(2) The amount of hydrogen gas generated per one hour after an initial anticorrosive film has been formed was measured to be 0.23 ml/USRt/hr.

Figure 10:
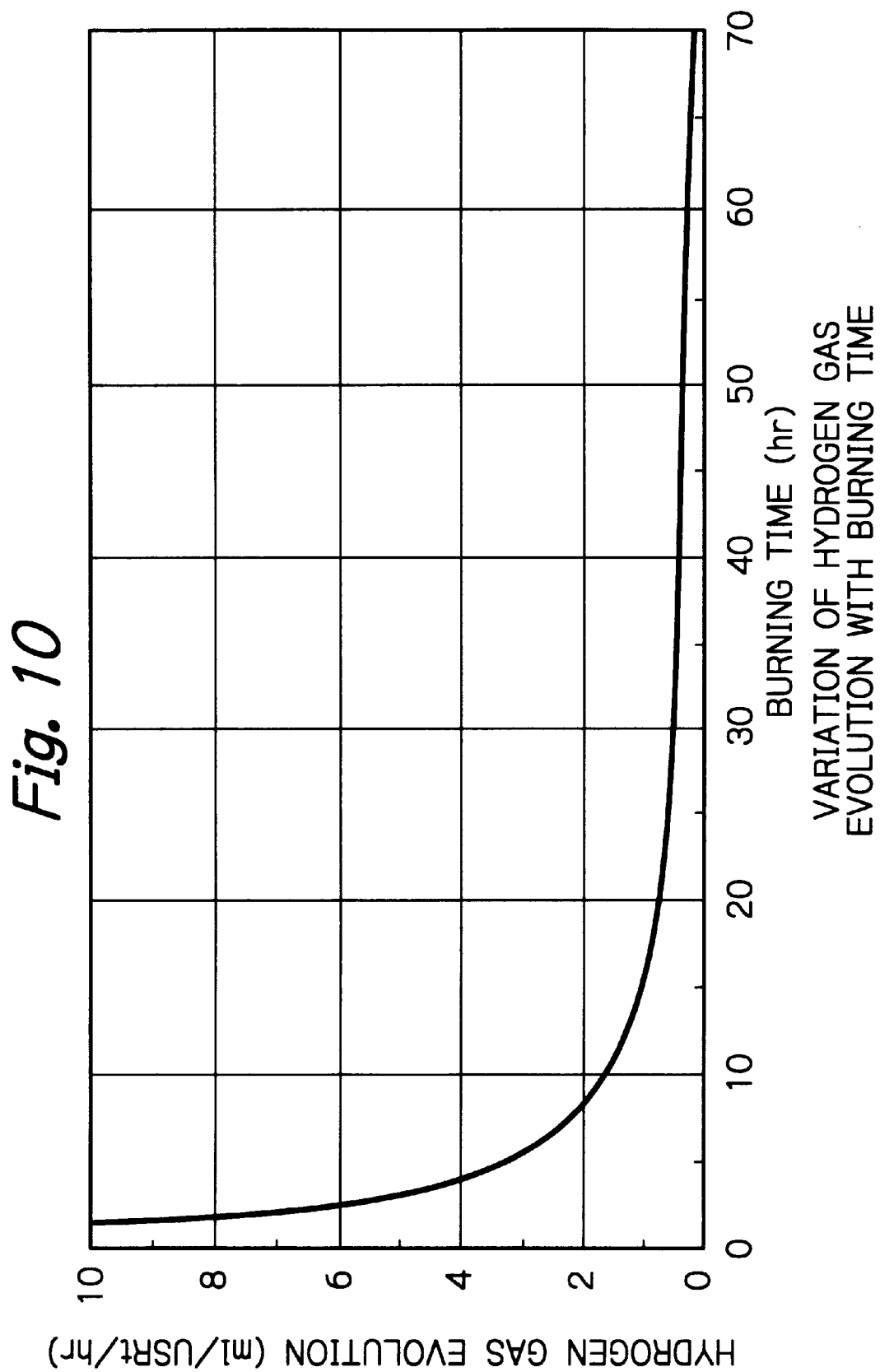
FIG. 10 is a graph showing variation of the amount of hydrogen gas generated with burning time in COMPARATIVE

The results are shown in FIG. 10.

Comparative Example 2: Practical Experiment on an Absorption Chiller-heater Using Lithium Molybdate as a Corrosion Inhibitor 1) Experimental Procedure A practical experiment was performed on a steel material surface conditions unadapted for lithium molybdate. The steel parts surface to be in contact with the absorbent solution in the absorption chiller-heater had a conventional steel material surface, i.e. the surface had a film of iron phosphate (having a thickness of about 0.1 μm) which is designed for use with a corrosion inhibitor lithium chromate).

The item to be measured was the amount of hydrogen gas generated per unit time during the initial anticorrosive film-forming period.

2) Experimental Conditions (1) Experimental apparatus: Double-effect direct fired absorption cold or hot water generating machine shown in FIG. 1 (50 USRt)

(2) Operation condition: 100% loaded cooling operation (3) Formula for the absorbent solution used:
a) Concentration of lithium bromide: 48 wt %
b) $Li_2MoO_4$: 750 ppm
c) LiOH: 0.03 N
(4) Solution conditions in a high-temperature regenerator (100% loaded cooling operation):
a) Concentration of lithium bromide: 64±1 wt %
b) Temperature of absorbent solution: 164±1° C.
(5) Experimental operation period: 70 hours
(6) The concentration of the corrosion inhibitor was not controlled during the initial anticorrosive film-forming period.
(7) The steel parts surface to be in contact with the absorbent solution in the absorption chiller-heater was treated with iron phosphate.

3) Experimental Method

An assembled absorption chiller-heater was operated for forming an initial anticorrosive film and the amount of hydrogen gas generated per unit time during this period is determined. Experimental conditions were described above.

The absorption chiller-heater tested had a purge tank for storing uncondensed gas. In the experiment, the purge tank was evacuated by a vacuum pump once per 30 minutes, and hydrogen gas issuing on the back pressure side was passed through a wet gas flowmeter (volumetric flowmeter) to determine the amount of hydrogen gas generated. The absorbent solution was also sampled to determine levels of the corrosion inhibitor, iron and copper in the solution.

For comparison between experiments, the following basic items were measured.

(1) Operation period taken for the amount of hydrogen gas generated per one hour to reach 1 ml/USRt (in view of the relation with the exhaust power of the exhaust system).

(2) The amount of hydrogen gas generated per one hour (ml/USRt/hr) after the initial anticorrosive film-forming process has been completed (operation period of 60 hours).

4) Experimental Results (1) Operation period taken for the amount of hydrogen gas generated per one hour to reach 1 ml/USRt could not be measured. The amount of hydrogen gas generated was not attenuated even after an operation period of 70 hours.

(2) Any good initial anticorrosive film has not been formed. A poor anticorrosive film has been formed with much considerable hydrogen gas evolution. The amount of hydrogen gas generated per one hour after an operation period of 60 hours was measured to be 3.72 ml/USRt/hr.

The results are shown in FIG. 11.

Comparative Example 3: Practical Experiment on an Absorption Chiller-heater Using Lithium Molybdate as a Corrosion Inhibitor 1) Experimental Procedure The experiment of this COMPARATIVE EXAMPLE 3 was performed while controlling the level of the lithium molybdate corrosion inhibitor during the initial anticorrosive film-forming period, as compared with COMPARATIVE EXAMPLE 2 wherein the level of lithium molybdate was not controlled. However, the steel parts surface to be in contact with the absorbent solution in the absorption chiller-heater had a conventional steel material surface, i.e. the surface had a film of iron phosphate (having a thickness of about 0.1 μm and designed for use with a corrosion inhibitor lithium chromate), similarly to COMPARATIVE EXAMPLE 2.

The item to be measured was the amount of hydrogen gas generated per unit time during the initial anticorrosive film-forming period.

2) Experimental Conditions (1) Experimental apparatus: Double-effect direct fired absorption cold or hot water generating machine shown in FIG. 1 (50 USRt)

(2) Operation condition: 100% loaded cooling operation (3) Formula for the absorbent solution used:
a) Concentration of lithium bromide: 48 wt %
b) $Li_2MoO_4$: 750 ppm
c) LiOH: 0.03 N
(4) Solution conditions in a high-temperature regenerator (100% loaded cooling operation):
a) Concentration of lithium bromide: 64±1 wt %
b) Temperature of absorbent solution: 164±1° C.
(5) Experimental operation period: 70 hours
(6) The concentration of the corrosion inhibitor was controlled during the initial anticorrosive film-forming period. The level of lithium molybdate dissolved in the absorbent solution during the initial anticorrosive film-forming period was kept at not less than 200 ppm in a similar manner as in EXAMPLE 1.
(7) Steel parts surface to be in contact with the absorbent solution in the absorption chiller-heater was treated with iron phosphate.

3) Experimental Method

An assembled absorption chiller-heater was operated for forming an initial anticorrosive film and the amount of hydrogen gas generated per unit time during this period was determined. Experimental conditions were described above.

The absorption chiller-heater tested had a purge tank for storing uncondensed gas. In the experiment, the purge tank was evacuated by a vacuum pump once per 30 minutes, and hydrogen gas issuing on the back pressure side was passed through a wet gas flowmeter (volumetric flowmeter) to determine the amount of hydrogen gas generated.

The absorbent solution was also sampled to determine levels of the corrosion inhibitor, iron and copper in the solution.

For comparison between experiments, the following basic items were measured.

(1) Operation period taken for the amount of hydrogen gas generated per one hour to reach 1 ml/USRt (in view of the relation with the exhaust power of the exhaust system).

(2) The amount of hydrogen gas generated per one hour (ml/USRt/hr) after the initial anticorrosive film-forming process has been completed (operation period of 60 hours).

4) Experimental Results (1) Operation period taken for the amount of hydrogen gas generated per one hour to reach 1 ml/USRt could not be measured. The amount of hydrogen gas generated was not attenuated even after an operation period of 70 hours.

(2) Any good initial anticorrosive film has not been formed. A poor anticorrosive film has been formed with considerable hydrogen gas evolution. The amount of hydrogen gas generated per one hour after an operation period of 60 hours was determined to be 2.00 ml/USRt/hr.

However, it could be demonstrated that the amount of hydrogen gas generated per one hour could be reduced by keeping the level of lithium molybdate dissolved in the absorbent solution at not less than 200 ppm during the initial anticorrosive film-forming period, as compared with COMPARATIVE EXAMPLE 2.

The results are shown in FIG. 12.

ADVANTAGES OF THE INVENTION

The present invention provides a very good anticorrosive film for use in an assembled absorption chiller-heater by defining conditions of absorbent solution, steel material surface and initial anticorrosive film-forming operation in a method for forming an initial anticorrosive film in an absorption chiller-heater, and thus established a technique using lithium molybdate alone as a corrosion inhibitor for an absorption chiller-heater. According to the method for forming an initial anticorrosion film in an absorption chiller-heater of the present invention, magnetite anticorrosion film having excellent adhesiveness and having no defect which shows excellent anticorrosion ability may be formed on steel surface by using as a corrosion inhibitor lithium molybdate alone.

What is claimed is:

1. An absorption chiller-heater having steel parts and containing an absorbent solution comprising lithium bromide as its main component and containing a lithium molybdate corrosion inhibitor, wherein at least part of the steel parts contacting with the absorbent solution include a bare metal surface having an arithmetic mean surface roughness of not more than 1.0 μm, which surface has then been coated with lithium molybdate whereby a lithium molybdate film having high anticorrosive power is formed on the surface.

2. The absorption chiller-heater according to claim 1, wherein the steel parts contacting with the absorbent solution constitute at least one of a high-temperature regenerator, low-temperature regenerator or high-temperature heat exchanger.

3. The absorption chiller-heater according to claim 1, wherein the steel parts having an arithmetic mean surface roughness of not more than 1.0 μm are obtained by machining the surface of a steel material.

4. The absorption chiller-heater according to claim 3, wherein the machining is polishing, grinding or drawing.

5. The absorption chiller-heater according to claim 1, wherein the steel parts having an arithmetic mean surface roughness of not more than 1.0 μm are obtained by subjecting a steel material to bright heat treatment.

6. A process for forming an initial anticorrosion film in an absorption chiller-heater having steel parts and containing an absorbent solution comprising lithium bromide as its main component and containing a lithium molybdate corrosion inhibitor, the process comprising assembling an absorption chiller-heater, wherein at least part of the steel parts of the absorption chiller-heater contacting with an absorbent solution at a temperature of higher than 100° C. include a bare metal surface having an arithmetic mean surface roughness of not more than 1.0 μm; introducing into the assembled chiller-heater an absorbent solution comprising lithium bromide as its main component and containing a lithium molybdate corrosion inhibitor dissolved in the solution at a level of 450–750 ppm; and conducting an initial anticorrosion film forming operation by operating the chiller-heater at a condition such that amount of the lithium molybdate dissolved in the absorbent solution contained in the chiller-heater is maintained at not less than 200 ppm, to thereby form a lithium molybdate film having high anticorrosive power on the surface of the steel parts in the chiller-heater.

7. The process according to claim 6, wherein the absorbent solution comprises 46–49 wt % of lithium bromide, 450–750 ppm of lithium molybdate dissolved in the solution, 0.03–0.1 wt % of lithium hydroxide and minor amount of a surfactant, and the balance of water.

8. The process according to claim 6, wherein the initial anticorrosion film forming operation is conducted by operating the chiller-heater while maintaining temperature of the absorbent solution in a high-temperature regenerator at higher than 130° C.

9. The process according to claim 6, wherein the amount of the lithium molybdate dissolved in the absorbent solution during the initial anticorrosion film forming operation is maintained at not less than 200 ppm by conducting intermittent dilution operation during cooling operation or heating operation to maintain concentration of lithium bromide in the solution at 46–49 wt %.

10. The process according to claim 6, wherein the amount of the lithium molybdate dissolved in the absorbent solution during the initial anticorrosion film forming operation is maintained at more than 200 ppm by conducting partial load continuous cooling operation or continuous heating operation.

* * * * *